Oct. 26, 1965
E. K. DOMBECK ETAL
3,213,970
AUTOMATIC ADJUSTOR
Filed Nov. 12, 1963
4 Sheets-Sheet 1
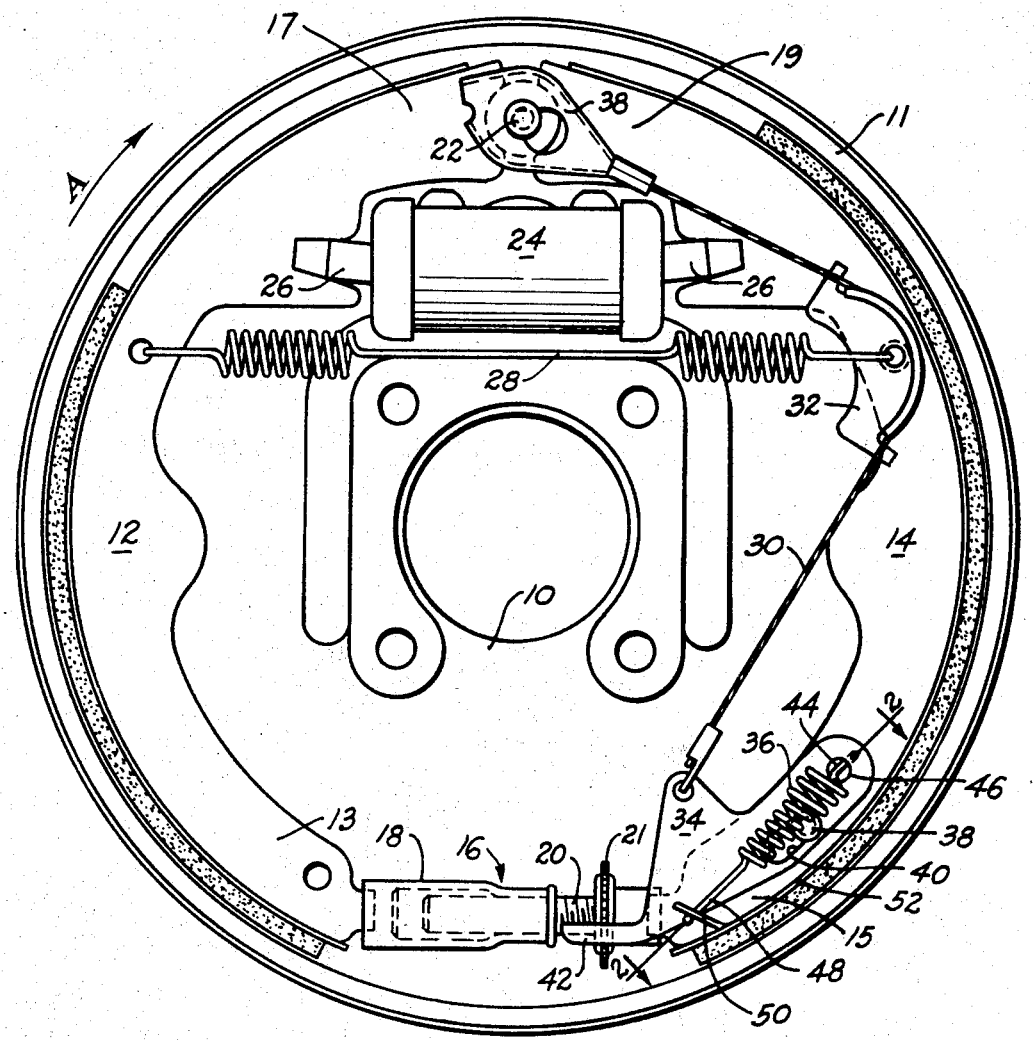
FIG_1
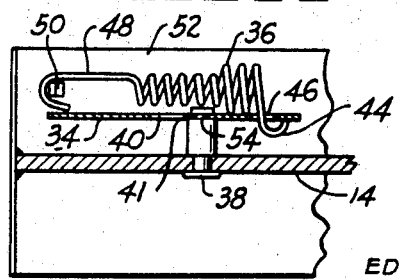
FIG_2
INVENTORS
EDWARD K. DOMBECK.
JOHN LEIF WINGE.
DONALD DIXON JOHANNESEN.
BY- *Sheldon F. Rayes*
ATTORNEY.

Oct. 26, 1965  E. K. DOMBECK ETAL  3,213,970
AUTOMATIC ADJUSTOR
Filed Nov. 12, 1963  4 Sheets-Sheet 2
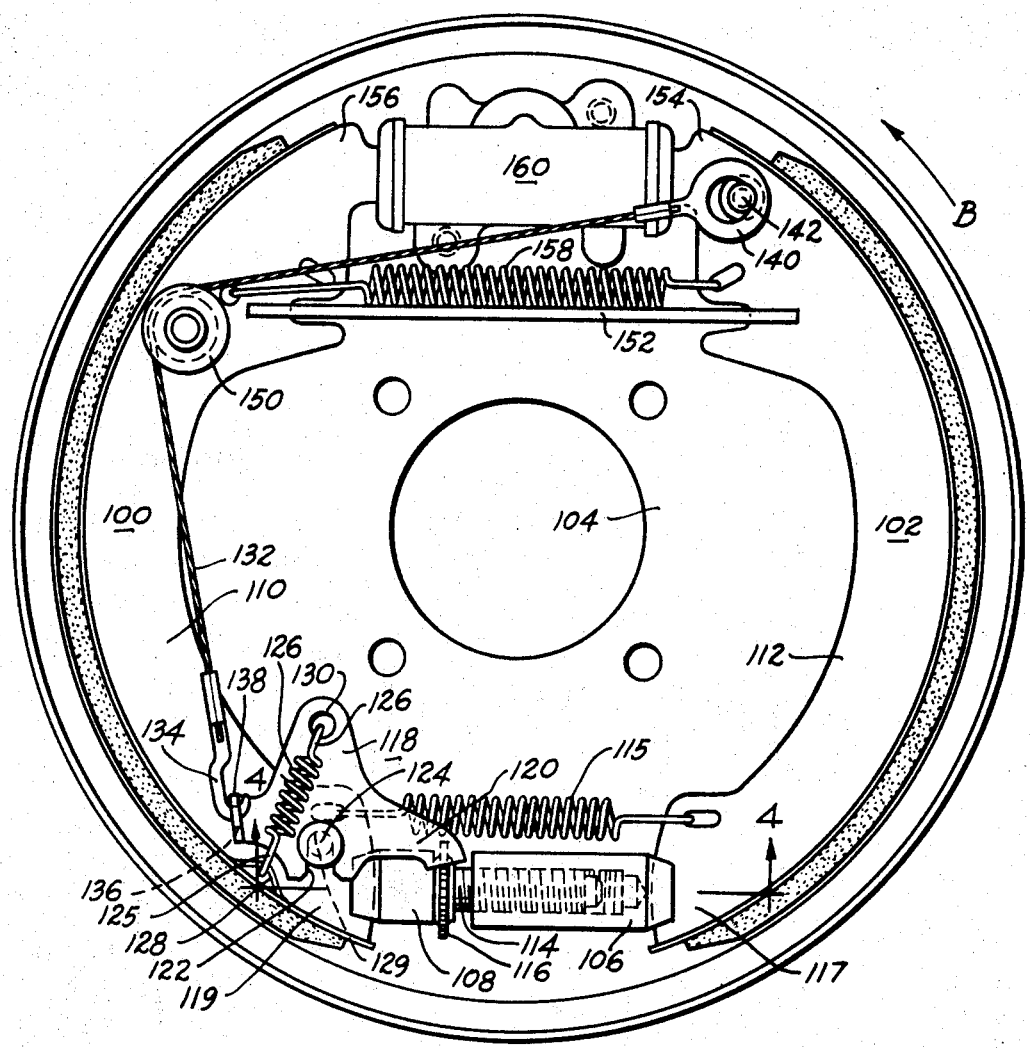
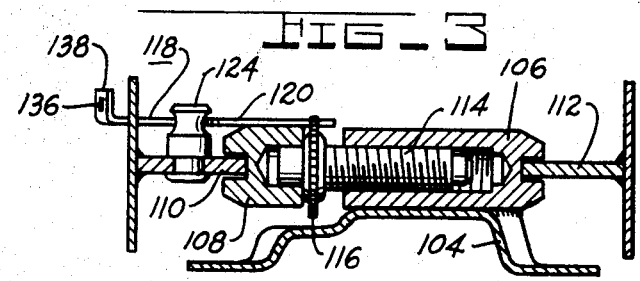
INVENTORS
EDWARD K. DOMBECK.
JOHN LEIF WINGE.
DONALD DIXON JOHANNESEN.
BY Sheldon F. Raines
ATTORNEY.

Oct. 26, 1965  E. K. DOMBECK ETAL  3,213,970
AUTOMATIC ADJUSTOR
Filed Nov. 12, 1963  4 Sheets-Sheet 3
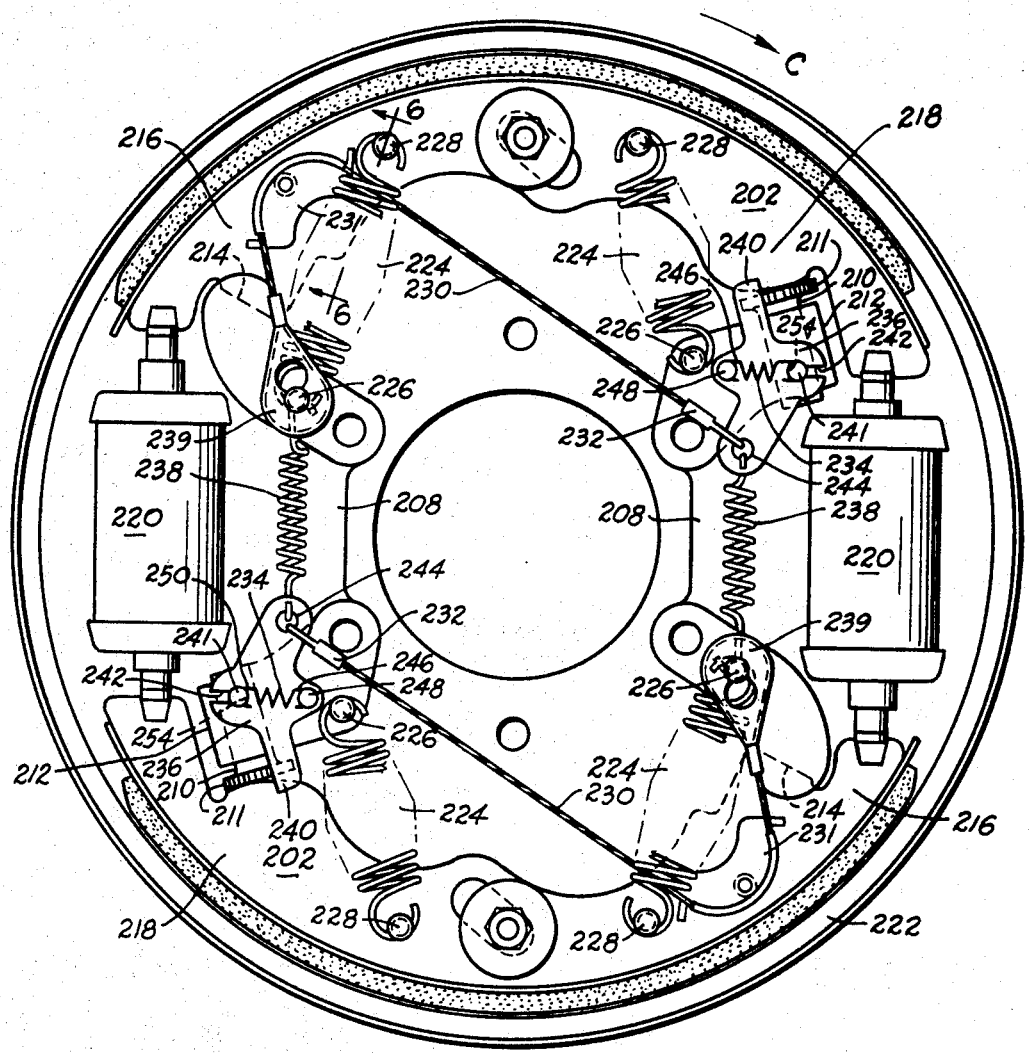
FIG_5
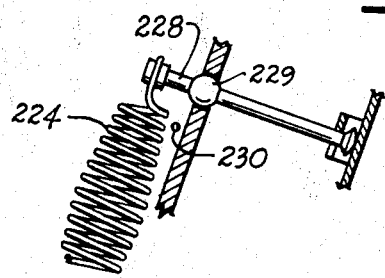
FIG_6
INVENTORS
EDWARD K. DOMBECK.
JOHN LEIF WINGE
DONALD DIXON JOHANNESEN.
BY- *Sheldon F. Rogers*
ATTORNEY.

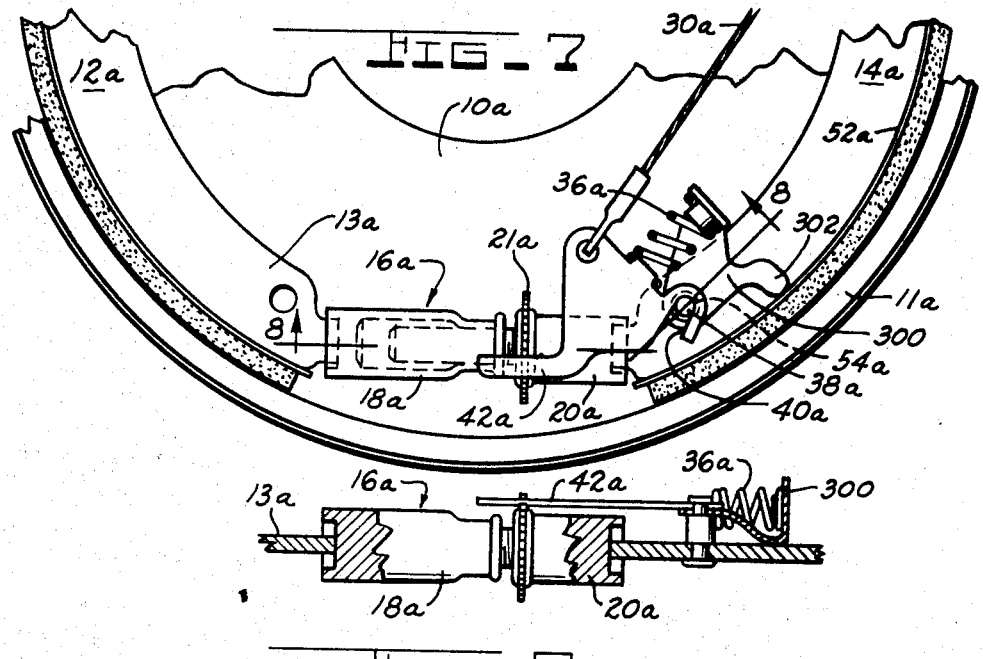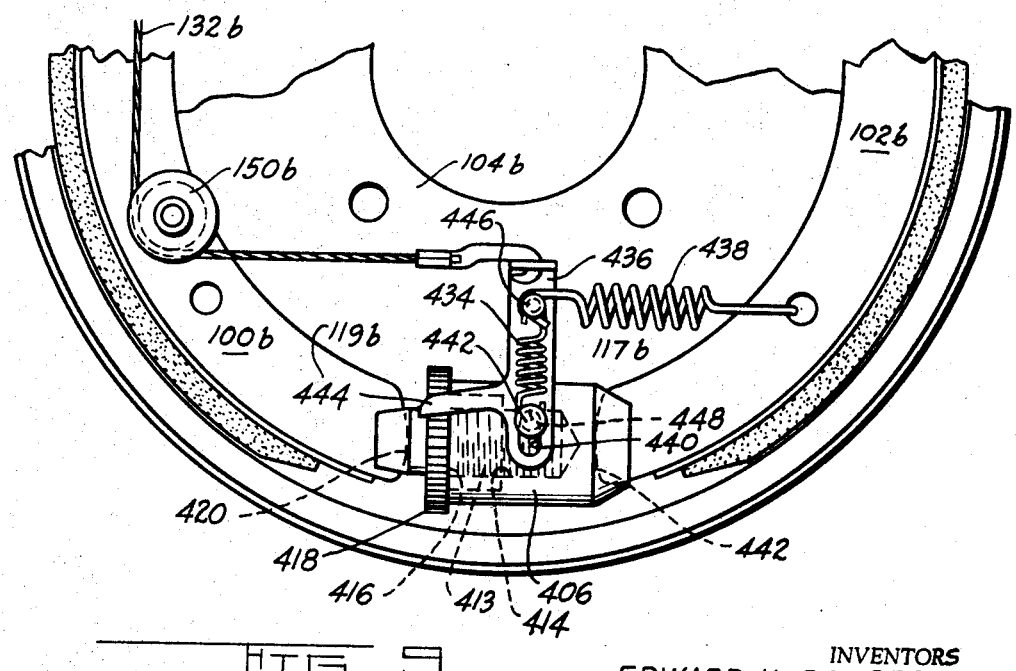

United States Patent Office 3,213,970
Patented Oct. 26, 1965

3,213,970
AUTOMATIC ADJUSTOR
Edward K. Dombeck, John Leif Winge, and Donald Dixon Johannesen, South Bend, Ind., assignors to The Bendix Corporation, South Bend, Ind., a corporation of Delaware
Filed Nov. 12, 1963, Ser. No. 322,658
1 Claim. (Cl. 188—79.5)

This invention relates to an automatic adjuster for a drum brake.

One of the objects of this invention is to provide a drum brake with an automatic adjusting mechanism to compensate for lining wear during brake actuation.

Another object of this invention is to provide a drum brake with an automatic adjuster which adjusts the brake during brake actuation.

A further object of this invention is to provide an automatic adjusting mechanism for a drum brake with over-travel means.

Other objects of the invention will become apparent to those skilled in the art from the following description with reference to the accompanying drawings wherein:

FIGURE 1 is an elevational view of a servo brake illustrating one embodiment of the invention;

FIGURE 2 is a view taken along section line 2—2 of FIGURE 1;

FIGURE 3 is an elevational view of a non-servo line type of brake assembly illustrating a modification of the embodiment of the invention illustrated in FIGURE 1;

FIGURE 4 is a view taken along section line 4—4 of FIGURE 3;

FIGURE 5 is a view of another brake assembly illustrating still another modification of the embodiment of the invention illustrated in FIGURE 1;

FIGURE 6 is a view taken along section line 6—6 of FIGURE 5;

FIGURE 7 is a partial view of the brake assembly of FIGURE 1 illustrating still another modification of the embodiment of the invention illustrated in FIGURE 1; and FIGURE 8 is a view taken along section line 8—8 of FIGURE 7; and FIGURE 9 is a partial view of a brake assembly of the type illustrated in FIGURE 3 illustrating still another modification of the embodiment of the invention illustrated in FIGURE 1.

Referring to FIGURE 1, a backing plate 10 is adapted to be mounted to a fixed part of a vehicle such as an axle flange (now shown). A pair of brake shoes 12 and 14 is slidably mounted on the backing plate and is interconnected at one pair of adjacent ends 13, 15 by an adjusting strut 16 which comprises an adjusting screw nut 18 and a rotatable adjusting screw 20 having a serrated wheel 21 integral therewith. The adjusting screw nut 18 is fixed to the end 13 of the brake shoe 12 and the adjusting screw 20 is rotatably mounted on the end 15 of the brake shoe 14. An anchor pin 22 is fixed to the backing plate 10 and disposed between the other ends 17 and 19 of the brake shoes and a fluid motor 24 is a pair of links 26 connected to the webs of each shoe for spreading the shoes into engagement with a brake drum 1. A shoe-to-shoe return spring 28 serves to retract the brake shoes against the anchor pin 22 to their brake release position.

An automatic adjusting mechanism is provided and comprises a cable 30, a guide 32, a lever 34, and a combination lever return and over-travel spring 36. A metal retainer 38 is connected to one end of the cable 30 and fastens the cable to the anchor pin 22. The cable 30 is slidably guided intermediate its end on the shoe 14 by the guide member 32 and is attached at its other end to the lever 34. A pin 38 is secured to the web of the brake shoe 14 and extends through an elongated slot 40 in the lever 34 and receives the edge of the slot within a groove 41. The shape of the slot 40 is such that the lever 34 may pivot about the pin 38 and may slide on the pin 38 and relative to the web of the brake shoe 14. A finger 42 of the lever 34 is positioned adjacent the serrated wheel 21 and is adapted to rotate the same upon clockwise movement of the lever 34. The combined lever return and over-travel spring 36 has one end 44 hooked through an opening 46 in the lever and has its other end 48 hooked to a projecting portion 50 bent from the rim 52 of the brake shoe 14. The axis of the spring 36 is offset from the pin 38 effecting a force on the lever 34 which biases the lever 34 in a counterclockwise direction about the pivot pin 38 and urges the edge 54 of the slot 40 into engagement with the pin 38. The spring 36 is also positioned to tilt the finger 42 in a direction toward the backing plate and into engagement with the serrated wheel 21. Due to the counterclockwise biasing force exerted on the lever 34 by the spring 36, the cable 30 is maintained in a taut condition defining the retracted position of the lever 34.

Upon brake application by actuation of the fluid motor 24, and assuming rotation of the brake drum 11 in the direction of arrow A, the shoes 12 and 14 will be spread until they engage the brake drum 11 at which time the brake drum will tend to carry the shoe 14 therewith. The rotational force on the brake shoe 14 will be transferred through the strut 16 to the brake shoe 12 whereupon the end 17 of the brake shoe 12 will engage the anchor 22. The movement of the shoe 14 and the guide member 32 will cause pulling by the cable 30 on the lever 34 effecting clockwise rotation of the lever 34 about the pivot pin 38 and thus rotation of the serrated wheel 21.

There is a point during brake application wherein the force of the brake shoe 14 bearing on the strut 16 will be so great as to prevent further rotation of the adjusting screw 20 by the serrated wheel 21. This will happen while the brake shoe 14 and the guide 31 are moving relative to the cable 30 still effecting a pulling force by the cable 30 on the lever 34 to rotate the same. However, due to the combined over-travel and lever return spring 36, any further pulling force exerted by the cable 30 will result in the lever 34 sliding on the pin 38 and relative to the brake shoe 14 against the force of the over-travel spring 36, thereby preventing damage to the adjusting mechanism or breakage thereof when the adjusting screw and the screw nut bind due to the forces exerted thereon by the brake shoe 14. Upon release of the fluid pressure on the fluid motor 24, the shoe-to-shoe return spring 28 will return the shoes to their released position and the return spring 36 will slide the lever 34 on the pin 38 to engage the edge 54 of the opening 40 with the pin 38 and also rotate the lever 34 in a counterclockwise direction to return the lever to its released position. The finger 42 of the lever 34 will either remain on the same tooth or pick up a new tooth of the serrated wheel 21 on its return, depending upon the increment of wear of the lining on the brake shoes.

Referring to FIGURE 3, there is illustrated another type of brake assembly including an arrangement of an automatic adjuster which incorporates the same principles as the previous embodiment. A pair of brake shoes 100 and 102 is slidably mounted on a backing plate 104 which has mounted thereon a stationary anchor strut comprising a pivot nut 106 fixedly secured to the backing plate and a socket 108 each having a slot receiving the webs 110 and 112 of the brake shoes 100 and 102, respectively. An adjusting screw 114 is threadedly secured to the pivot nut 106 and is rotatably secured to the socket 108 and has a serrated wheel 116 integral therewith which is adapted to be rotated by a lever 118 of the automatic break adjusting mechanism. A spring 115 interconnects shoe ends 117 and 119 to maintain the same in engagement with the adjusting pivot nut 106 and the socket 108, respectively. The lever 118 has a finger portion 120 adjacent the serrated wheel 116 to engage and rotate the same upon clockwise rotation of the lever 118 and also has an elongated slot 122 through which a grooved pin 124, secured to the web 112 of the brake shoe 100, extends and on which the lever 118 rotates. A combination lever return spring and over-travel spring 126 is attached at one end 125 to a projection 128 of the rim of the brake shoe 100 and at the other end 127 to the edge of the opening 130 of the lever 118. The axis of the spring 126 is offset from the pin 124 to exert a counterclockwise rotational force on the lever 118 and to urge the end edge 129 of the slot 122 into engagement with the pin 124. The spring is also arranged to exert a tilting force on the finger 120 which biases the finger in a direction toward the backing plate and into engagement with the serrated wheel 116. A cable 132 has a hook 134 at one end which extends through an opening 136 of a flange 138 on the lever 118 and has a metal retainer 140 at its other end which is fastened to a pin 142 extending axially from the web 112 of the brake shoe 102. The cable 132 engages a pulley 150 intermediate its ends thereof, and is maintained in a taut condition by the combination lever return and over-travel spring 126. A rigid strut 152 interconnects the shoe ends 154, 156 and a shoe return spring 158 connected to each shoe holds each shoe in engagement with the strut 152 during brake released position.

In operation, assuming rotation of the brake drum in the direction of arrow B, the brake shoes 100 and 102 will be spread by the wheel cylinder 160 into the brake drum with each shoe anchoring on the anchoring strut. The movement of the brake shoes will cause cable 132 to pull on the lever 118 resulting in clockwise rotation of the lever about the pin 124 and rotation of the serrated wheel 116. When the adjusting screw 106 binds due to the anchoring force of the shoe 102 thereon, any further pulling force exerted by the cable 132 on the lever 118 will result in the lever 118 pulling away from its pivot pin 124 against the force of the combination return and over-travel spring 126 thereby preventing damage to the automatic adjusting mechanism. Upon release of the pressure in the fluid motor 160, the shoe return spring 158 will return the shoes 100 and 102 to their released position to rest on the strut 152 and the combination return and over-travel spring 126 will urge the edge 129 of the slot 122 into bearing relationship with the pin 124 and will also pivot the lever in a counterclockwise direction to return to its normal retracted position. The finger 120 will either remain on the same tooth or pick up a new tooth on the serrated wheel 116 depending upon the increment of brake shoe lining wear. The new adjusted released position of the brake shoe 100 will be translated to the brake shoe 102 by the strut 152 to adjust the position of the shoe 102.

Referring to FIGURE 5, another type of brake assembly is illustrated which includes a modified embodiment of the automatic adjuster shown in FIGURE 1.

A pair of brake shoes 202 is slidably mounted on a backing plate 204 and a pair of castings 208 is located between adjacent ends of the shoes and is also mounted to the backing plate. A rotatable adjusting screw 210 having a serrated wheel 111 is threadedly received within a boss 212 on each casting 208. Rotation of each serrated wheel will extend the screw 210 out of the boss to adjust the released position of each shoe. The ends 216 of each brake shoe anchor on a respective anchoring surface 214 provided on each casting and the ends 118 of each brake shoe anchor on a respective serrated wheel 111. A pair of wheel cylinders 220 is located between the adjacent ends of the brake shoes and are capable of spreading the break shoes into engagement with a rotatable drum 222 upon fluid actuation. A plurality of shoe return springs 224 is secured at one end to a respective one of a plurality of stationary pins 226, secured to the castings 208, and is secured at the other end to a plurality of toggle pins 228. Each toggle pin 228 has one end pivotally mounted to the backing plate 204 and extends through an opening 229 of their respective brake shoes. The pins 228 bear on the edge of the opening 229 to transmit the force from the return spring 224 to each shoe to return the same to its normally released position.

An automatic adjusting mechanism is provided and comprises a cable 230, a guide 231, an over-travel spring 234, a lever 236 and a lever return spring 238. Each cable 230 has a metal retainer 239 at one end for fastening the cable to a respective stationary pin 226 and a hook 232 at the other end extending through an opening 244 in the lever and is slidably guided intermediate its ends on their respective shoes by the guide 231. A finger 240 of the lever 236 is positioned adjacent the serrated wheel 211 and is adapted to rotate the same upon clockwise rotation of the lever 236. Each lever 236 pivots about a pin 241 which extends axially from the boss 212 through a slot 242 in the lever. One end of the lever return spring 238 hooks onto an edge of the opening 244 of the lever 236 and has its other end hooked onto the pin 226 to effect a counterclockwise biasing force on the lever 236. Each over-travel spring 234 is connected at one end 246 to a pin 248 which is secured to the lever 236 and has its other end 250 secured to the pin 241 to normally maintain the edge 254 of the slot 242 in engagement with the pin 241. The strength of the over-travel spring 234 is greater than the strength of the return spring 238. Due to the counterclockwise biasing force exerted on each lever 236 by the respective return spring 238, the edge of the opening 244 engages the hooked end 232 of the spring 234 thereby maintaining the cable 230 in a taut condition and defining the normally retracted position of the lever 236.

Upon brake application by actuation of the fluid motors 220, and assuming rotation of the brake drum in a direction of the arrow C, the shoes 202 will be spread until they engage the brake drum 222 at which time the brake shoes will anchor on the serrated wheels 211.

The movement of each shoe 202 and the guide members 231 will cause pulling by each cable 230 on their respective levers 236 effecting clockwise rotation of the levers 236 about their pivot pin 241 and thus rotation of each serrated wheel 211. There is a point during brake application wherein the force of the brake shoes 202 bearing on their respective adjusting screws 210 will be so great as to prevent further rotation of each adjusting screw 210 and their serrated wheels 111. This will happen while the brake shoes 202 and the guides 231 are moving relative to their respective cables 230 still effecting a pulling force by the cable 230 on the lever 236 to rotate the same. However, due to the slot 242 of the lever and the over-travel spring 234, any further pulling force exerted by each cable will result in each lever 236 sliding relative to the pin 241 against the force of the over-travel spring 234, thereby preventing damage to the adjusting mechanism when the adjusting screw binds due to the anchoring forces exerted thereon by the brake shoes. Upon release of the brake, the over-travel spring 234 will return the edge 254 of the slot 242 against the pin 241 and the lever return spring 238 will effect counterclockwise rotation on the lever 236 to return the same to its normally retracted position. The finger 240 of the lever 236 will either remain on the same tooth or pick up a new tooth of the serrated wheel on its return depending upon the increment of lining wear.

Referring to the embodiment of FIGURE 7, there is shown a partial view of the brake of FIGURE 1 with the elements that are the same as that in FIGURE 1 being designated by the same reference numerals with a small "a" affixed thereto. This embodiment is different than that of FIGURE 1 in that the combination lever return and over-travel spring 36a is compressed between the lever 34a and a reaction member 300 which has a projection portion 302 for engagement with the rim 52a of the brake shoe 14a and which is pivotally mounted on the pin 38a. The spring is retained in place by projections 304 and 306 on the lever 34a and reaction member 300, respectively and acts to pivot, the reaction member 300 in a clockwise direction about pin 38a until the projection 302 engages the rim and also acts on the lever 34a to bias the edge 54a of the slot 40a into engagement with the grooved pin 38a and to bias the lever in a counterclockwise direction wherein the cable 30a is placed in a normally taut condition to define the retracted position of the finger 42a. The spring 36a also effects a force on the lever to bias the finger 42a in a direction toward the backing plate 10a into engagement with the serrated wheel 21a. In operation, the cable 30a will act on the lever 34a to pivot the lever in a clockwise direction against the force of the spring 36a to rotate the serrated wheel 21a and the adjusting screw 20a and when the adjusting screw binds, the lever 34a will slide relative to the pin 38a against the force of spring 36a to prevent damage to the adjusting mechanism. Upon brake release, the spring 36a will return the lever 34a to a position wherein the edge 54a of the slot 40a engages the pin 38a and will also rotate the lever 34a in a counter-clockwise direction to return it to its normally retracted position.

Referring to FIGURE 9, there is a partial view of the brake illustrated in FIGURE 3 utilizing a different arrangement of the adjusting mechanism. Those elements which are similar to that in FIGURE 3 are given the same reference numeral with a "b" attached thereto. A pair of brake shoes 100b and 102b is slidably mounted on a backing plate 104b which has mounted thereon a stationary anchor casting 406 between one pair of adjacent shoe ends 117b and 119b. A non-rotatable screw 413 is slidably received within a counterbored opening 414 and an internally threaded sleeve 416, mating with the threads of the screw 413, is rotatably received within the opening 414 of the casting 406 and has a serrated wheel 418 integrally connected thereto for rotating the sleeve and thereby effecting longitudinal movement of the screw 413 to adjust the position of the shoes. The web end 119b of the shoe 100b is slidably received within a slot 420 of the adjusting screw 413 and the web end 117b of the shoe 102b is slidably received within a slot 422 of the casting 406. An automatic adjusting mechanism comprises a cable 132b, a pulley 150b, an over-travel spring 434 is connected at one end to the pin 442 438. The lever 436 has a slot 440 which receives a pin 442 therein extending axially from the anchor casting 406. A finger 444 projects from the lever 436 for engagement with the serrated wheel 418 for rotating the same upon counterclockwise rotation of the lever 436. The over-travel spring 436 is connected at one end to the pin 442 and at the other end to a pin 446 extending from the lever 436 and serves to normally bias the edge 448 of the slot 440 into engagement with the pin 442. The return spring 438 is hooked at one end to the web of the brake shoe 102b and at the other end to the pin 446 on the lever 436 to provide a clockwise rotational force on the lever 436 whereby the cable 132b will be in a taut condition thereby defining the normally retracted position of the finger 444 relative to the serrated wheel 418. The over-travel spring 434 is also at an angle to bias the finger 444 of the lever in a direction toward the backing plate and into engagement with the serrated wheel 418. The return spring 438 and the cable 132b serve to create a force on the ends 117b and 119b of the brake shoes to maintain them in engagement with the anchor.

In operation, the shoes 100b and 102b will be spread by the wheel cylinder (not shown) into the brake drum with each shoe anchoring on the anchor block 206. When the adjusting sleeve 416 binds due to the anchoring force of the shoe 100b exerted thereon, the lever 436 will slide relative to the pin 442 against the force of the over-travel spring 434 to prevent damage to the adjusting mechanism. Upon brake release, the over-travel spring 434 will return the edge 442 of the slot 440 into engagement with the pin 442 and the return spring 438 will effect clockwise rotation of the lever 436 to its normally retracted position.

It should be understood that the particular adjusting lever and over-travel spring arrangement shown with relation to the type of brake is not limited to that type of brake but may be utilized on the other types of brakes shown in this application.

Although this invention has been illustrated and described in connection with specific embodiments, numerous other adaptations of this invention will become apparent to those skilled in the art. We intend to include within the scope of the following items all equivalent applications of the invention whereby the same or substantially the same results will be obtained.

What is claimed is:

In a brake assembly: a support member, a pair of brake shoes slidably mounted on said support member in end to end relationship; said brake shoes each comprising an arcuate rim, a transverse web extending from the inner surface of said rim, and a friction lining on the outer surface of said rim; adjustable means located between one pair of adjacent ends of said shoes; said adjustable means comprising a rotatable element for adjusting the position of said shoes during rotation thereof; a pin extending transversely to and carried by the web of one of said shoes; a lever having a finger portion in engagement with said rotatable element and an elongated opening receiving said pin therethrough; said elongated opening comprising an end edge joining a pair of elongated side edges; a reaction member pivotally mounted on said pin and having a portion thereof for engaging the inner surface of the rim of said one shoe; a coil spring connected at one end to said lever and at its other end to said reaction member; the axis of said spring being offset from the axis of said pin; said spring being arranged to bias said lever in one rotational direction about said pin, bias said reacting member in the opposite rotational direction about said pin into engagement with the inner surface of the rim of said one shoe, and urge said end edge into engagement with said pin; force transmitting means operatively connected to said lever for imparting a force on said lever to rotate the same about said pin in said opposite direction upon spreading of said shoes; said lever being arranged relative to said rotatable element to impart through said finger a rotational force on said rotatable element when said lever is rotated in said opposite direction; whereby upon spreading of said shoes said lever will be rotated in said opposite direction to rotate said rotatable element and thereafter slide relative to said pin against the force of said spring when said rotatable element binds and prevents further rotation of said lever.

References Cited by the Examiner

UNITED STATES PATENTS

| 3,010,544 | 11/61 | Dahle et al. | 188—79.5 |
| 3,114,438 | 12/63 | Helvern | 188—79 |
| 3,114,439 | 12/63 | Bauman | 188—79.5 |

FOREIGN PATENTS 612,360   11/48   Great Britain.

ARTHUR L. LA POINT, *Primary Examiner.*

DUANE A. REGER, *Examiner.*